(12) United States Patent
Tage et al.

(10) Patent No.: US 9,188,215 B2
(45) Date of Patent: Nov. 17, 2015

(54) LUBRICATION STRUCTURE FOR TRANSMISSION

(71) Applicant: MAZDA MOTOR CORPORATION, Hiroshima (JP)

(72) Inventors: Shinya Tage, Hiroshima (JP); Yasuki Okadome, Hiroshima (JP); Noriyuki Wada, Hiroshima (JP); Masanosuke Nagamine, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/344,302

(22) PCT Filed: May 13, 2013

(86) PCT No.: PCT/JP2013/003060
§ 371 (c)(1),
(2) Date: Mar. 11, 2014

(87) PCT Pub. No.: WO2013/179591
PCT Pub. Date: Dec. 5, 2013

(65) Prior Publication Data
US 2015/0080134 A1 Mar. 19, 2015

(30) Foreign Application Priority Data

Jun. 1, 2012 (JP) ................................. 2012-125731

(51) Int. Cl.
*F16C 1/24* (2006.01)
*F16H 57/04* (2010.01)

(52) U.S. Cl.
CPC .......... *F16H 57/043* (2013.01); *F16H 57/0426* (2013.01); *F16H 57/0428* (2013.01); *F16H 57/0494* (2013.01)

(58) Field of Classification Search
CPC  F16H 57/0426; F16H 57/0428; F16H 57/043
USPC .............................................. 464/7; 184/6.12
See application file for complete search history.

(56) References Cited

U.S. PATENT DOCUMENTS 2,498,828 A * 2/1950 Sheppard ................. 184/6.12 X
5,071,390 A * 12/1991 Latshaw ............................ 464/7
(Continued)

FOREIGN PATENT DOCUMENTS

| JP | 58-155455 U | 10/1983 |
|----|----|----|
| JP | 2008-261361 A | 10/2008 |

(Continued)

OTHER PUBLICATIONS

International Search Report; PCT/JP2013/003060; May 13, 2013.

*Primary Examiner* — Gregory Binda
(74) *Attorney, Agent, or Firm* — Studebaker & Brackett PC (57) ABSTRACT

A guide groove including a groove section extending from the vicinity of an entrance of a main passage to a side opposite the entrance is formed on the inner circumferential surface of a main passage. The groove section is provided in an inclined fashion with respect to the axial direction such that lubricating oil inside the groove section is sent towards the side opposite the entrance by rotation of a rotary shaft in a predetermined direction. Of a plurality of subsidiary passages, the entrance of a subsidiary passage that is most distant from the entrance of a main passage is disposed in the guide groove. In a lubrication structure for a transmission, insufficient lubrication is effectively prevented in parts requiring lubrication corresponding to the subsidiary passages, irrespective of the positions of the subsidiary passages in the axial direction, while avoiding increase in the size of the transmission.

18 Claims, 7 Drawing Sheets

(56) References Cited

U.S. PATENT DOCUMENTS 8,579,512 B2 * 11/2013 Radinger et al. ............. 464/7 X
2008/0251324 A1 10/2008 Kuryu

FOREIGN PATENT DOCUMENTS

| JP | 2009-197821 A | 9/2009 |
| JP | 2012-52649 A | 3/2012 |

* cited by examiner

LUBRICATION STRUCTURE FOR TRANSMISSION

TECHNICAL FIELD

The present invention relates to a lubrication structure for a transmission in which a main oil passage extending in an axial direction from one end of a rotary shaft for transmitting drive power, and a plurality of subsidiary oil passages extending in radial directions and communicating with the main oil passage and an outer circumferential section of the rotary shaft, are formed inside the rotary shaft, and the invention belongs to the technical field of drive power transmission in a vehicle.

BACKGROUND ART

A transmission mounted in a vehicle is provided with a rotary shaft for transmitting drive power as represented by an input shaft by which drive power output from a drive source, such as an engine or electric motor, or the like, is input, and an output shaft which outputs drive power transmitted from the input shaft, to a differential device, or the like. Transmission gears are provided on these rotary shafts, and in the case of a manual transmission, a synchronization device which synchronizes the rotary shaft rotation and the transmission gear rotation is also provided.

Furthermore, in the case of a manual transmission, lubricating oil is supplied to parts requiring lubrication, such as the gaps between the rotary shafts of the transmission and the gears which fit freely on the rotary shafts, the coupling portion (indexing section) between the hub and the synchronizer ring in the synchronization device, and the like, in order to reduce friction and suppress abnormal noise. In a known lubrication structure for supplying lubricating oil to these parts requiring lubrication, lubricating oil inside the transmission case taken up by rotation of a ring gear of the differential device which is provided in an integrated fashion with the transmission, and some transmission gears, is received in an oil path, and passes from the oil path and through an in-case oil passage, or the like, to an oil passage inside the rotary shaft, from where the lubricating oil is supplied to the parts requiring lubrication outside the rotary shaft.

In a lubrication structure of this type, a main oil passage extending in an axial direction from one end of the rotary shaft of the transmission, and a plurality of subsidiary oil passages extending in radial directions and communicating with the main oil passage and an outer circumferential section of the rotary shaft, are formed inside the rotary shaft. Furthermore, the positions of the subsidiary oil passages in the axial direction are set in accordance with the positions of the parts requiring lubrication. According to this lubrication structure, it is possible to supply lubricating oil that has been introduced into the main oil passage, to the respective parts requiring lubrication on the outside of the rotary shaft, via the subsidiary oil passages.

However, in a lubricating structure of this type, since the distance from the entrance of the main oil passage to the entrance of the subsidiary oil passage differs, for each subsidiary oil passage, then there is a problem in that a relatively large amount of lubricating oil is supplied to the subsidiary oil passages which are relatively close to the entrance of the main oil passage, and the amount of lubricating oil supplied becomes less in subsidiary oil passages which are relatively distant from the entrance of the main oil passage. Consequently, in some driving states, insufficient lubrication is liable to occur in parts requiring lubrication corresponding to subsidiary oil passages which are distant from the entrance of the main oil passage. One example of a state where a problem of insufficient lubrication of this kind can readily occur is a state where the transmission is in neutral, so the ring gear of the differential device does not rotate and hence taking up of the lubricating oil due to the rotation of the ring gear cannot be expected to occur.

In view of this problem, Patent Document 1 discloses a structure for guiding lubricating oil to a plurality of subsidiary oil passages extending in radial directions from a main oil passage extending in an axial direction, inside a rotary shaft of a manual transmission, wherein lubricating oil is also supplied satisfactorily to subsidiary oil passages which are distant from an entrance of the main oil passage.

More specifically, in the technology in Patent Document 1, a tubular resin member constituting a main oil passage is fitted into an oil hole extending in an axial direction formed inside the rotary shaft of the transmission, in such a manner that lubricating oil introduced into an entrance section at one end portion of the resin member is guided via an inclined oil passage formed in a circumferential wall section of the resin member to a subsidiary oil passage provided in the rotary shaft so as to extend in a radial direction. A plurality of subsidiary oil passages of the rotary shaft are provided at mutually different positions in the axial direction, and an inclined oil passage is provided in the resin member respectively for each of the subsidiary oil passages. The respective inclined oil passages are provided so as to be inclined outwards in radial directions, towards the downstream side in the axial direction. Furthermore, the entrances of the inclined oil passages are provided in a circumferential edge section of the entrance section of one end portion of the resin member, and the exits of the inclined oil passages are provided on an outer circumference surface of the resin member, at positions communicating with the entrances of the subsidiary oil passages.

According to the technology of Patent Document 1, the lubricating oil introduced into the entrance section at one end portion of the resin member is guided to the entrances of the inclined oil passages by the centrifugal force created by the rotation of the rotary shaft, and by utilizing the inclination of the inclined oil passages and the centrifugal force created by the rotation of the rotary shaft, the lubricating oil introduced into the inclined oil passages is guided to the exits of the inclined oil passage and is introduced into the subsidiary oil passages of the rotary shaft which are communicated with the exits of the inclined oil passages. Consequently, the lubricating oil is supplied individually to the subsidiary oil passages via the respectively corresponding inclined oil passages, and therefore it is possible to supply the lubricating oil in substantially uniform fashion to the subsidiary oil passages and hence to the respective parts requiring lubrication corresponding to the subsidiary oil passages, irrespective of the positions of the subsidiary oil passages in the axial direction.

However, in the technology in Patent Document 1, it is, necessary to form the inclined oil passages in the resin member so as to be inclined outwards in radial directions towards the downstream side with respect to the axial direction, as described above, in order to guide the lubricating oil to the subsidiary oil passages of the rotary shaft, and therefore the entrances of the inclined oil passages are disposed towards the inner side in the radial direction, compared to the exits of the inclined oil passages.

Accordingly, the entrance sections at the end portion of the resin member are narrow, and therefore the amount of lubricating, oil introduced into the entrance sections is decreased. Consequently, the amount of lubricating oil supplied to the parts requiring lubrication via the subsidiary oil passages is also decreased, and there is a drawback in that the effect in suppressing insufficient lubrication described above is not necessarily adequate.

Conversely, in the technology in Patent Document 1, if it is sought to maintain the introduced amount of lubricating oil by maintaining the internal diameter of the entrance sections in one end portion of the resin member, then it is necessary to increase the outer diameter of the resin member. Consequently, in this case, the increase in the diameter of the rotary shaft gives rise to an increase in the size of the transmission.

Furthermore, this problem is not limited to a manual transmission but also occurs similarly in an automatic transmission or continuously variable transmission, provided that the transmission has a plurality of parts requiring lubrication at different positions in the axial direction on the outer circumferential section of a rotary shaft.

Patent Document 1: Japanese Patent Application Publication No. 2012-52649

SUMMARY OF THE INVENTION

Therefore, it is an object of the present invention to effectively prevent insufficient lubrication in parts requiring lubrication corresponding to subsidiary oil passages, irrespective of the positions of the subsidiary oil passages in the axial direction, while avoiding increase in the size of a transmission, in a lubrication structure for a transmission in which a main oil passage extending in the axial direction from one, end of a rotary shaft for transmitting drive power, and a plurality of subsidiary oil passages extending in radial directions and communicating with the main oil passage and the outer circumferential section of the rotary shaft, are formed inside the rotary shaft.

More specifically, the present invention is a lubrication structure for a transmission, having: a rotary shaft which is driven to rotate in a predetermined direction, and a plurality of parts requiring lubrication provided on the rotary shaft, at mutually different positions in an axial direction, wherein provided inside the rotary shaft are: a main oil passage that has an entrance at one end of the rotary shaft in the axial direction, and that extends in the axial direction from the entrance; and a plurality of subsidiary oil passages that extend in radial directions at positions in the axial direction corresponding to the parts requiring lubrication and that are communicated with an outer circumferential section of the rotary shaft and with the main oil passage; a guide groove including a groove section extending from the vicinity of the entrance of the main oil passage to a side opposite the entrance is formed on an inner circumferential surface of the main oil passage; the groove section is provided in an inclined fashion with respect to the axial direction such that lubricating oil inside the groove section is sent toward the side opposite the entrance, by rotation of the rotary shaft in the predetermined direction; and of the plurality of subsidiary oil passages, an entrance of the subsidiary oil passage most distant from the entrance of the main oil passage is disposed in the guide groove.

In relation to the direction of rotation of the rotary shaft, the term "predetermined direction" given above means the prescribed direction of rotation in the case of a rotary shaft which always has a uniform direction of rotation (for example, an input shaft coupled to an engine output shaft, etc.), and means the direction of rotation which is used most frequently (for example, the direction of rotation during forward travel of the vehicle) in the case of a rotary shaft which has a reversible direction of rotation (for example, an output shaft coupled to a differential device or an input shaft coupled to an output shaft of an electric motor which has a reversible direction of rotation, etc.)

The aforementioned and other objects, characteristics and advantages of the present invention will become apparent from the following detailed description and the accompanying drawings.

MODE FOR CARRYING OUT THE INVENTION

Embodiments of the present invention are described below.

First Embodiment

Figure 1:
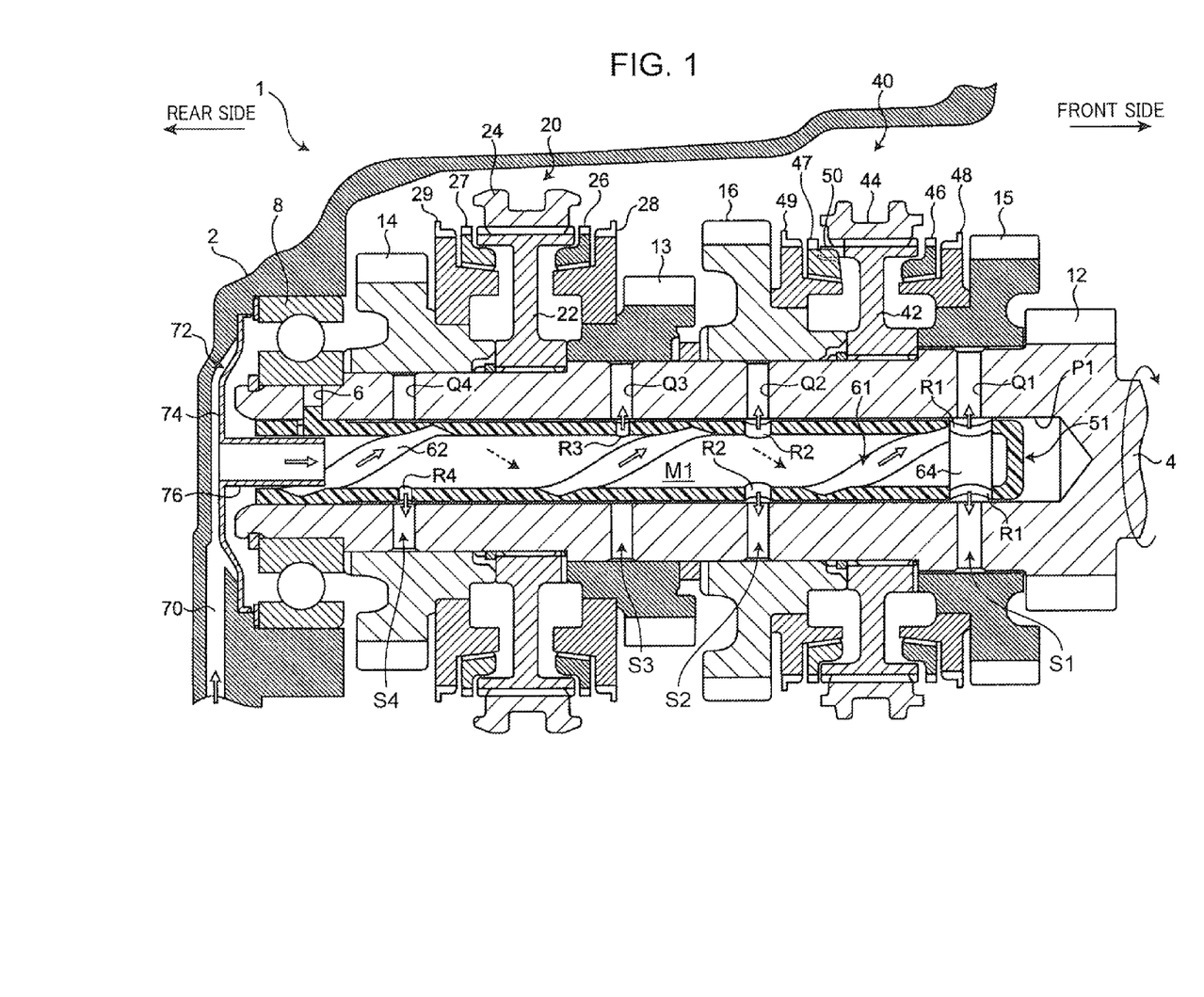
FIG. 1 is a cross-sectional diagram showing a principal part of a manual transmission provided, with a lubrication structure relating to one embodiment of the present invention.

FIG. 1 shows an input shaft 4 of a manual transmission 1 provided with a lubrication structure relating to the present embodiment, and a peripheral area thereof.

Both end portions of the input shaft 4 are supported rotatably on the case 2 via bearings 8. Furthermore, although not shown in the drawings, one end portion of the input shaft 4 (the right-hand end portion in FIG. 1) is coupled to an output shaft of a drive source, such as an engine, via a clutch and when the clutch is in an engaged state, the input shaft 4 rotates in a clockwise direction as viewed from the drive source (the right-hand side in FIG. 1), together with the output shaft.

In the description given below, the side towards the drive source in the axial direction is called the "front side", and the side away from the drive source is called, the "rear side".

A plurality of transmission gears 12, 13, 14, 15, 16 (12 to 16) and a plurality of synchronization devices 20, 40 are provided at mutually different positions in the axial direction, on the input shaft 4.

In terms of specific transmission gears, in sequence from the front side, a first gear (not illustrated), a second gear 12, a fifth gear 15, a sixth gear 16, a third gear 13, and a fourth gear 14 are provided on the input shaft 4. The first gear and the second gear 12 are fixed to the input shaft 4, and the third to sixth transmission gears 13, 14, 15, 16 (13 to 16) fit freely on the input shaft 4. Although not shown in the drawings, the transmission gears 12 to 16 on the input shaft 4 mesh with corresponding transmission gears on a counter shaft arranged substantially in parallel with the input shaft 4.

Moreover, as the synchronization devices 20, 40 on the input shaft 4, a third and fourth gear synchronization device 20 is provided between the third gear 13 and the fourth gear 14, and a fifth and sixth gear synchronization device 40 is provided between the fifth gear 15 and the sixth gear 16, in the axial direction.

The synchronization devices 20, 40 include hubs 22, 42 which are spline meshed to the outer side of an input shaft 4, sleeves 24, 44 which are movable in the axial direction and are spline meshed to the outer sides of the hubs 22, 42, and pairs of synchronizer rings 26, 27, 46, 47 coupled to the hubs 22, 42, in an indexing section 50 which is provided at a plurality of locations in the circumference direction. The hubs 22, 42, sleeves 24, 44 and synchronizer rings 26, 27, 46, 47 rotate in a united fashion with the input shaft 4. Furthermore, the synchronizer rings 26, 27, 46, 47 are externally fitted onto cone sections of the clutch gears 28, 29, 48, 49 which are fixed to corresponding transmission gears 13 to 16.

When a shift operation is performed to any one of the third to sixth gears, the sleeves 24, 44 move axially towards the corresponding transmission gears 13 to 16, and in accordance with this, keys (not illustrated) push the synchronizer rings 26, 27, 46, 47 in the axial direction. Consequently, friction is produced between the synchronizer rings 26, 27, 46, 47 and the cone sections of the clutch gears 28, 29, 48, 49, and the rotation of the input shaft 4 and the rotation of the transmission gears 13 to 16 starts to become synchronized. As the movement of the sleeves 24, 44 proceeds, and the sleeves 24, 44 and the clutch gears 28, 29, 48, 49 mesh together, then the input shaft 4 and the transmission gears 13 to 16 become completely synchronized in rotation, and the gear shift is completed.

It is necessary to form oil films by supplying lubricating oil to the parts requiring lubrication, such as the respective tooth surfaces of the transmission gears 12 to 16 and the synchronization devices 20, 40, the gaps between the outer circumferential surface of the input shaft 4 and the inner circumferential surfaces of the third to sixth transmission gears 13 to 16, and the indexing section 50 which couples the hubs 22, 42 of the synchronization devices 20, 40 and the synchronizer rings 26, 27, 46, 47, and the like, with the object of reducing friction and suppressing abnormal noise. For this object, in the present embodiment, an oil passage is formed inside the input shaft 4, in such a manner that lubricating oil is supplied to the parts requiring lubrication described above, via the oil passage.

A concrete description of a lubrication structure of a manual transmission 1 relating to the present embodiment is given below.

Although not shown in the drawings, the lubricating oil inside the case is taken up, for example, by the rotation of the ring gear of the differential device and the transmission gears on the counter shaft, and the like, and the lubricating oil thus taken up is received in the oil path and guided to an in-case oil passage 70.

The in-case oil passage 70 is provided so as to guide lubricating oil to a guide member 72 which is disposed in the vicinity of the rear-side end portion of the input shaft 4. The guide member 72 has a plate section 74 fixed to the case 2, and a pipe section 76 extending in the axial direction from the plate section 74 toward the front side, in such a manner that lubricating oil supplied from the in-case oil passage 70 is guided to an oil passage inside the input shaft 4 from the pipe section 76.

A main oil hole P1 extending in the axial direction from the rear-side end portion of the input shaft 4 towards the front side, and a plurality of subsidiary oil holes Q1, Q2, Q3, Q4 (Q1 to Q4) which pass through the input shaft 4 extending in a radial direction so as to traverse the main oil hole P1, are provided in the input shaft 4.

The main oil hole P1 is provided so as to extend from the rear-side front end of the input shaft 4 to the same position as the second gear 12 in the axial direction.

More specifically, as the subsidiary oil holes Q1 to Q4, a first subsidiary oil hole Q1, a second subsidiary oil hole Q2, a third subsidiary oil hole Q3 and a fourth subsidiary oil hole Q4 are provided, in sequence from the front side. The subsidiary oil holes Q1 to Q4 are provided in positions corresponding to the transmission gears 13 to 16 in the axial direction, so as to communicate with the free fitting sections of the transmission gears 13 to 16 and the main oil hole P1. The subsidiary oil holes Q1 to Q4 each have substantially equal diameters.

A cylindrical hollow member 51 having an open section only on the rear-side end is fitted into the main oil hole P1 in such a manner that the open end section is positioned in the rear-side end portion of the input shaft 4. Consequently, a main oil passage M1 extending in the axial direction from the entrance on the rear-side end portion of the input shaft 4 is formed inside the hollow member 51. For the material of the hollow member 51, a resin is used, for example, but the material is not limited in particular to this.

A plurality of supply ports R1, R2, R3, R4 (R1 to R4) by which lubricating oil is discharged, from the interior of the hollow member 51 and is supplied to the subsidiary oil holes Q1 to Q4 of the input shaft 4, is provided in a circumferential wall section of the hollow member 51. More specifically, as the supply ports R1 to R4, a first supply port R1 which is communicated with the first subsidiary oil hole Q1, a second supply port R2 which is communicated with the second subsidiary oil hole Q2, a third supply port R3 which is communicated with the third subsidiary oil hole Q3 and a fourth supply port R4 which is communicated with the fourth subsidiary oil hole Q4 are provided, in sequence from the front side.

Consequently, a plurality of subsidiary oil passages S1, S2, S3, S4 (S1 to S4) which extend in radial directions and are communicated with the main oil passage M1 and the outer circumferential section of the input shaft 4 are constituted by the supply ports R1 to R4 of the hollow member 51 and the subsidiary oil holes Q1 to Q4 of the input shaft 4. More specifically, in order from the furthest position from the entrance of the main oil passage M1, a first subsidiary oil passage S1 constituted by the first supply port R1 and the first subsidiary oil hole Q1, a second subsidiary oil passage S2 constituted by the second supply port R2 and the second subsidiary oil hole Q2, a third subsidiary oil passage S3 constituted by the third supply port R3 and the third subsidiary oil hole Q3, and a fourth subsidiary oil passage S4 constituted by the fourth supply port R4 and the fourth subsidiary oil hole Q4 are formed, and the supply ports R1 to R4 form entrances of the subsidiary oil passages S1 to S4.

A more concrete description of the configuration of the hollow member 51 is now given with reference to FIG. 2 to FIG. 5.

Figure 2:
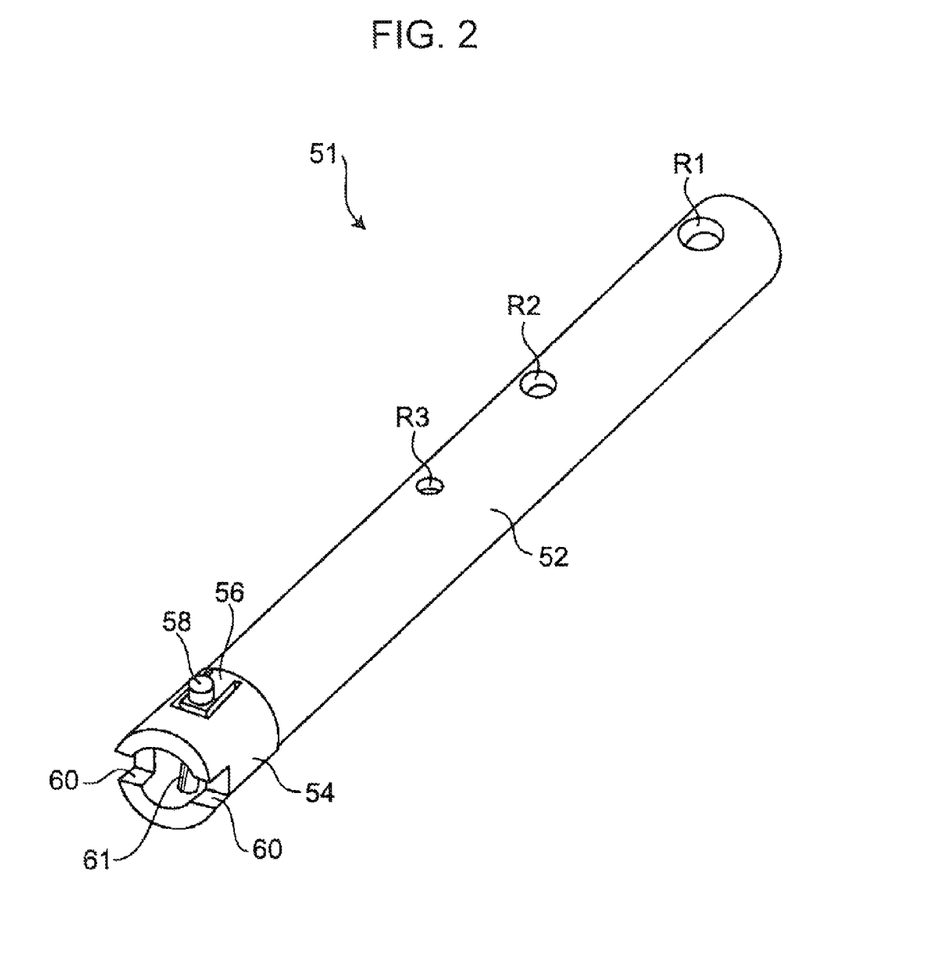
FIG. 2 is a perspective diagram showing a cylindrical hollow member installed inside an input shaft of the manual transmission in FIG. 1.

As shown in FIG. 2, the hollow member 51 has an entrance section 54 which constitutes an entrance of the main oil passage M1 and a long cylindrical main body 52 which is communicated with the entrance section 54.

Figure 3A:
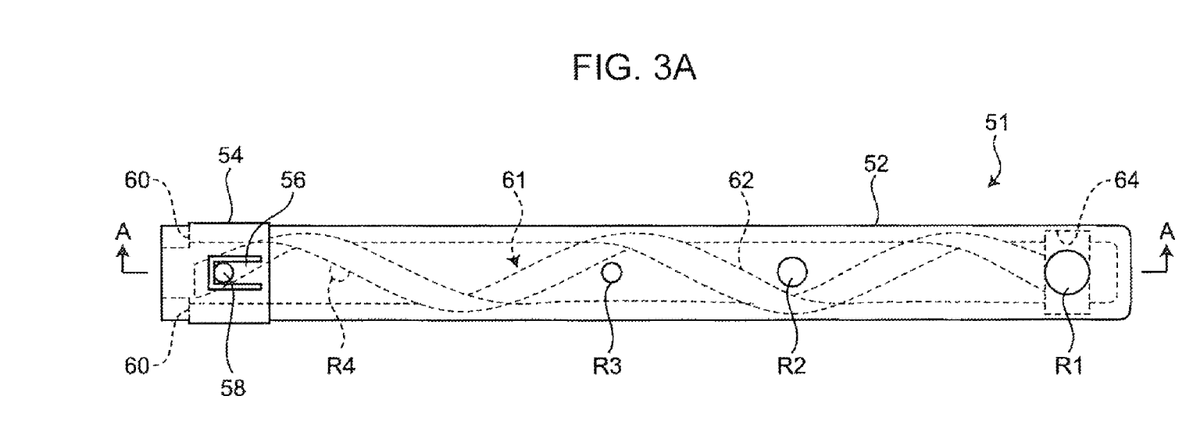
FIG. 3A is a side face diagram of a hollow member shown in FIG. 2
Figure 3B:
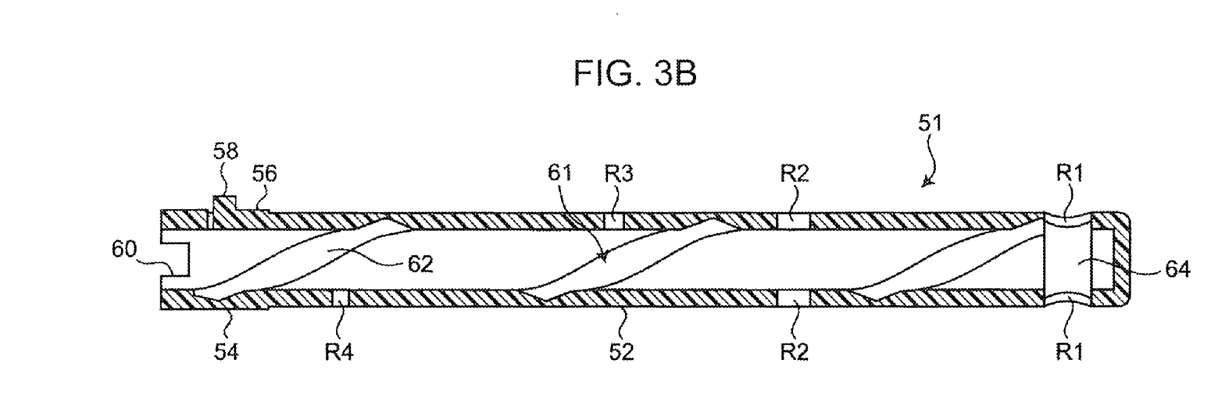
FIG. 3B is a cross-sectional diagram along A-A in FIG. 3A.
Figure 5:
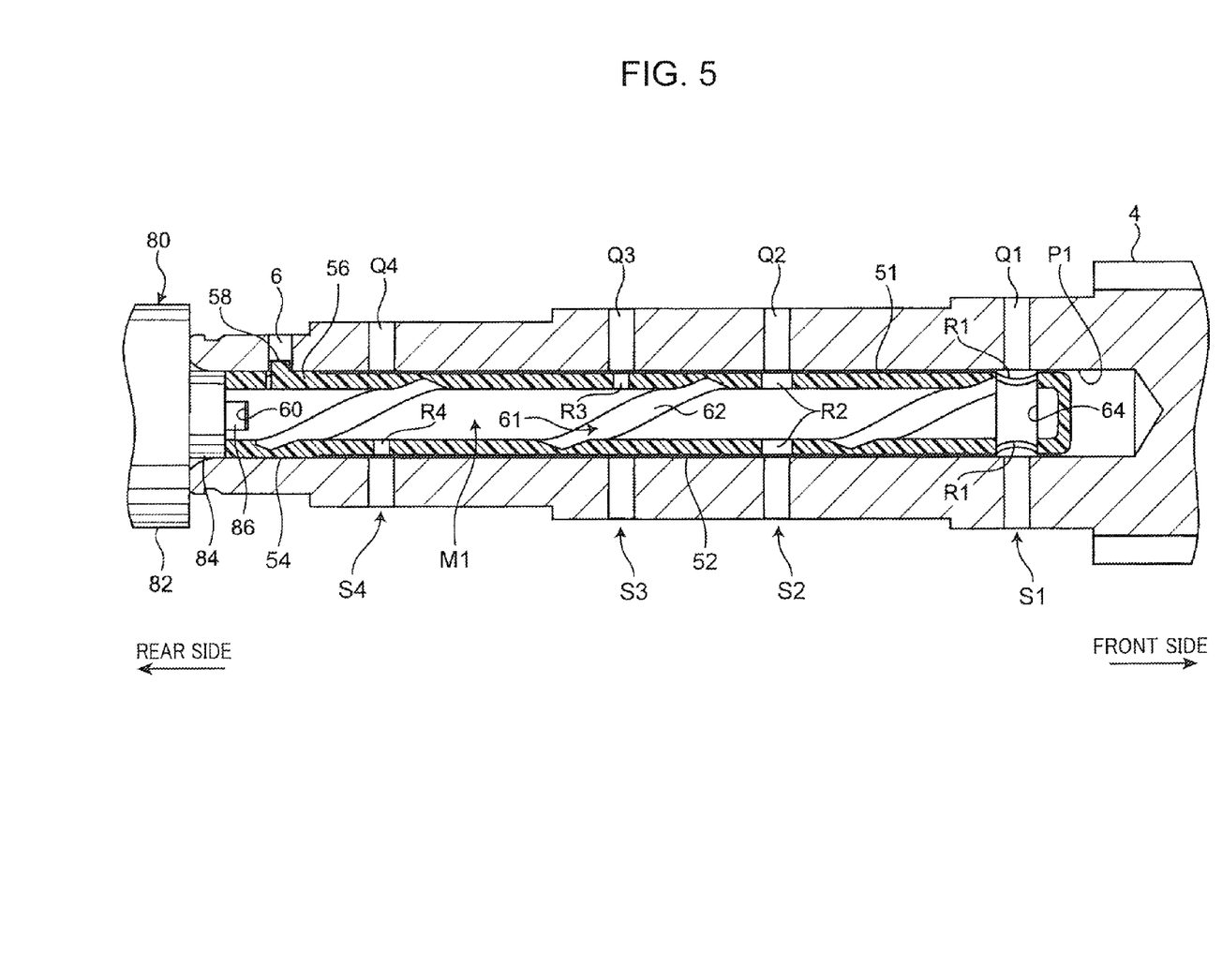
FIG. 5 is a cross-sectional diagram showing a method of installing the hollow member inside the input shaft.

As shown in FIG. 3B, the inner diameter of the hollow member 51 is substantially even throughout the whole length, and the inner circumferential surface of the entrance section 54 and the inner circumferential surface of the cylindrical main body 52 are formed in a mutually continuous fashion. On the other hand, the outer diameter of the hollow member 51 is larger in the entrance section 54 compared to the cylindrical main body 52, and a step difference is formed in the outer circumferential surface of the hollow member 51 in the boundary portion between the entrance section 54 and the cylindrical main body 52. As shown in FIG. 5, the outer diameter, of the entrance section 54 is substantially equal to the inner diameter of the main oil hole P1 of the input shaft 4, and the outer diameter of the cylindrical main body 52 is formed to be slightly smaller than same. Therefore, in a state where the hollow member 51 has been fitted into the main oil hole P1, the outer circumferential surface of the entrance section 54 of the hollow member 51 makes tight contact with the inner circumferential surface of the main oil hole P1, and the cylindrical main body 52 is disposed at a slight gap from same.

As shown in FIG. 5, a positioning pin 58 is formed to project on the outer circumferential surface of the entrance section 54, and this positioning pin 58 can engage with a positioning hole 6 provided so as to extend in a radial direction in the input shaft 4. More specifically, as shown in FIG. 2, the positioning pin 58 is provided to project on a movable piece 56 which is formed in the entrance section 54. The movable piece 56 has a free end which can move in the radial direction due to elastic deformation of the movable piece 56.

Furthermore, as shown in FIG. 5, a notch section 60 which couples with a jig 80 for installing the hollow member 51 is provided in the front end open section of entrance section 54.

As shown in FIG. 5, the jig 80 comprises a first base section 82 having an abutting surface which is pressed against the rear-side end, face of the input shaft 4, a second base section 84 having, an abutting surface which is provided on the abutting surface of the first base section 82 and which is pressed against the end face of the entrance section 54 of the hollow member 51, and a projecting section 86 provided on the abutting surface of the second base section 84.

The first base section 82 has, for example, a round bar shape having an outer diameter larger than the outer diameter of the rear-side end face of the input shaft 4. The second base section 84 has, for example, a round bar shape having an outer diameter which is larger than the inner diameter of the entrance section 54 of the hollow member 51 and is equal to or less than the inner diameter of the rear-side end portion of the input shaft 4. Furthermore, the projecting section 86 is formed to extend in a radial direction, and has a cross-sectional shape capable of engaging with the notch section 60 of the entrance section 54 of the hollow member 51. The length of the projecting section 86 is greater than the inner diameter of the entrance section 54 of the hollow member 51 and equal to or less than the inner diameter of the rear-side end portion of the input shaft 4.

When the hollow member 51 is installed inside the input shaft 4 by using the jig 80, firstly, the hollow member 51 is inserted into the main oil hole P1 of the input shaft 4 from the sealed end side. In so doing, the positioning pin 58 which is provided to project in the entrance section 54 of the hollow member 51 interferes with the end face of the input shaft 4, but the positioning pin 58 is pushed in an inward radial direction as the movable piece 56 performs elastic deformation, whereby the whole of the hollow member 51 can be inserted into the main oil hole P1.

Subsequently, the projecting section 86 and the second base section 84 of the jig 80 are inserted into the main oil hole P1, and the projecting section 86 is caused to engage with the notch section 60 of the entrance section 54 of the hollow member 51, in addition to which the abutting surface of the second base section 84 is pressed against the end face of the entrance section 54.

Furthermore, when the abutting surface of the first base section 82 of the jig 80 is pressed against the end face of the input shaft 4 and the hollow member 51 is pushed in to the front side in the axial direction, then the position of the positioning pin 58 of the hollow member 51 and the position of the positioning hole 6 of the input shaft 4 match each other in the axial direction.

Finally, when the jig 80 is rotated about the axis of the input shaft 4, at the moment that the position of the positioning pin 58 and the position of the positioning hole 6 match each other in the circumferential direction, the movable piece 56 which has been deformed elastically returns and the positioning pin 58 engages with the positioning hole 6. Consequently, the hollow member 51 is fitted into the main oil hole P1 in a state where movement in any direction is restricted by the engagement of the positioning pin 58 and the positioning hole 6.

As shown in FIG. 1, the pipe section 76 of the guide member 72 is provided inside the entrance section 54 of the hollow member 51 which has been positioned in this way. Consequently, lubricating oil guided by the in-case oil passage 70 is introduced reliably into the entrance section 54 of the hollow member 51 via the pipe section 76 of the guide member 72.

Furthermore, although the positioning hole 6 for positioning the hollow member 51 is formed in the input shaft 4 as described above, the positioning hole 6 is closed off on the outer side in the radial direction by the bearing 8, as shown in FIG. 1. Therefore it is possible to suppress leakage of the lubricating oil inside the input shaft 4, via the positioning hole 6, by using the bearing 8, without having to provide a special member for closing off the positioning hole 6.

Figure 4:
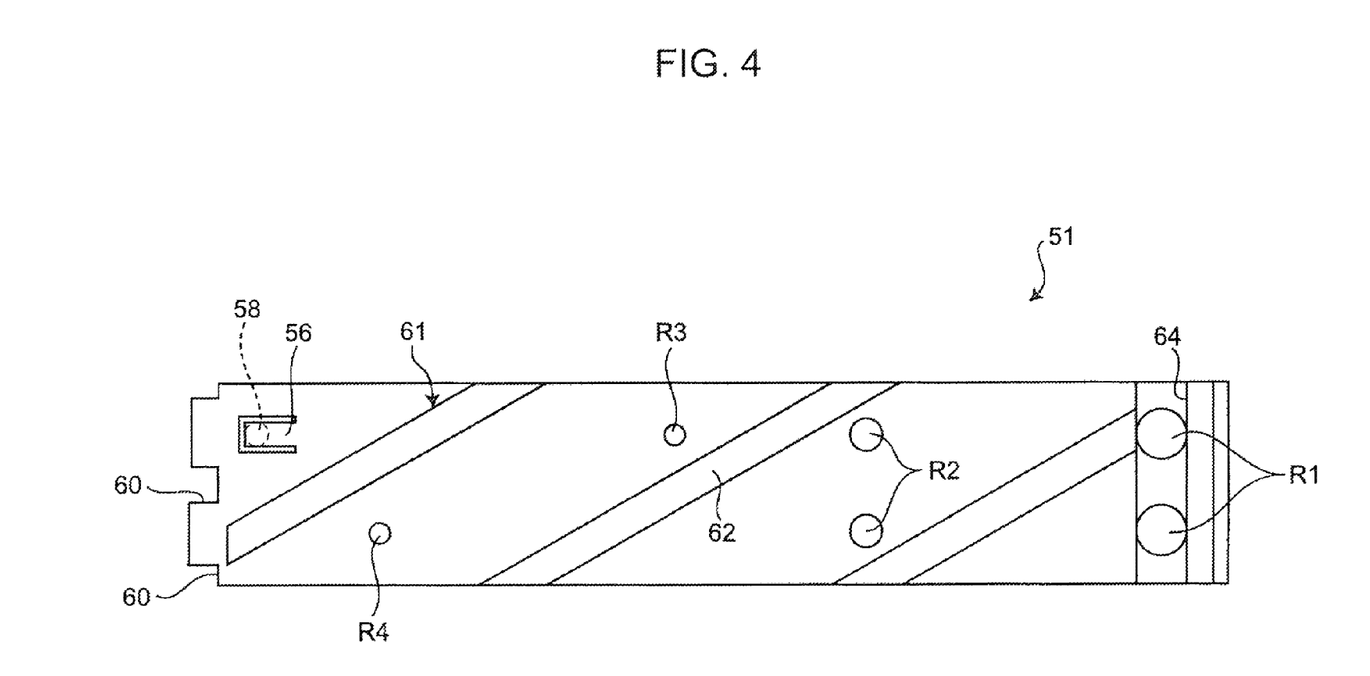
FIG. 4 is an expanded diagram of the inner circumferential surface of the hollow member shown in FIG. 2.

As shown by the side face diagram in FIG. 3A, the cross-sectional diagram in FIG. 3B and the expanded diagram in FIG. 4, a guide groove 61 which guides the lubricating oil to the side opposite the entrance is formed on the inner circumferential surface of the hollow member 51 which constitutes the main oil passage 11. The guide groove 61 has a spiral groove section 62 extending from the entrance section 54 to the side opposite the entrance, and an endless circumferential groove section 64 extending in a circumferential direction in the vicinity of the end on the side opposite to the entrance.

The spiral groove section 62 is provided in an inclined fashion with respect to the axial direction, in such a manner that lubricating oil inside the spiral groove section 62 is sent towards the side opposite the entrance by the rotation of the input shaft 4. Consequently, the lubricating ail introduced into the inside of the hollow member 51 is sent towards the side opposite the entrance, by utilizing the rotation of the input shaft 4 and the inclination of the spiral groove section 62. The width and depth of the spiral groove section 62 are substantially uniform throughout the whole length thereof, but it is also possible to change at least one of the width or depth of the spiral groove section 62 depending on the position in the length direction.

Furthermore, the end portion of the spiral groove section 62 on the side opposite to the entrance combines with the circumferential groove section 64, in such a manner that lubricating oil is guided from the spiral groove section 62 to the circumferential groove section 64. The width and depth of the circumferential groove section 64 are substantially uniform throughout the whole circumference thereof, but it is also possible to change at least one of the width or depth of the circumferential groove section 64 depending on the position in the circumferential direction.

Next, a concrete configuration of the supply ports R1 to R4 will be described.

The first supply port R1 and the second supply port R2 are each provided as a pair of ports, and the third supply port R3 and the fourth supply port R4 are provided as one port each.

Furthermore, the shapes of the supply ports R1 to R4 are a round shape, for example, but may also be a shape other than a round shape. With regard to the surface of the supply parts R1 to R4, the third supply port R3 and the fourth supply port R4 have substantially the same size, whereas the second supply ports R2 are larger than the third supply port R3 and the fourth supply port R4, and the first supply ports R1 are larger than the second supply ports R2.

The pair of first supply ports R1 are both disposed in the guide groove 61. More specifically, one of the first supply ports R1 is disposed in the combining section of the spiral groove section 62 and the circumferential groove section 64, and the other of the first supply ports R1 is disposed so as to oppose the one first supply port R1 in the circumferential groove section 64.

On the other hand, the pair of second supply ports R2 are disposed so as to oppose each other, in a portion of the inner circumferential surface of the hollow member 51 which avoids the guide groove 61. Furthermore, the third supply port R3 and the fourth supply port R4 are disposed in a portion of the inner circumferential surface of the hollow member 51 which avoids the guide groove 61.

Consequently, the lubricating oil which is guided to the side opposite the entrance by the guide groove 61 can be prevented from flowing out via the other supply ports R2 to R4 before reaching the first supply ports R1 which are most distant from the entrance section 54, and the lubricating oil can be supplied in concentrated fashion to the first supply ports R1.

The angle of inclination of the spiral groove section 62 of the guide groove 61 with respect to the axial direction should be adjusted, or the positions in the circumferential direction of the supply ports R1 to R4 and the subsidiary oil holes Q1 to Q4 of the input shaft 4 which correspond to the supply ports R1 to R4 should be adjusted, in such a manner that only the first supply ports R1 are disposed in the guide groove 61, and the remaining supply ports R2 to R4 are disposed in portions avoiding the guide groove 61, on the inner circumferential surface of the hollow member 51. In the case where the positions are adjusted, since the angle of inclination of the spiral groove section 62 can be set as desired, then it is possible to send the lubricating oil that has been introduced into the inside of the hollow member 51, to the side opposite the entrance, in a more effective fashion, by adjusting the angle of inclination.

Furthermore since the surface area of the first supply ports R1 is greater than the surface area of the other supply ports R2 to R4, then it is possible to supply the lubricating oil to the first supply ports R1 in a more concentrated fashion. Moreover, since two first supply ports R1 are provided, lubricating oil can be guided to the first subsidiary oil holes Q1 on either side of the main oil hole P1 in the input shaft 4, from these two first supply ports R1. Therefore, it is possible to supply lubricating oil in a satisfactory manner to the outer circumferential section of the input shaft 4, via the first subsidiary oil holes Q1.

On the other hand, the second supply ports R2 which are second most distant from the entrance section 54 have a larger surface area than the third supply port R3 and the fourth supply port R4 which are nearer than these to the entrance section 54. Moreover, since two second supply ports R2 are provided, lubricating oil can be guided to the second subsidiary oil holes Q2 on either side of the main oil hole P1 in the input shaft 4, from these two second supply ports R2. Therefore, it is also possible to achieve a satisfactory supply of lubricating oil to the outer circumferential section of the input shaft 4, in the second subsidiary oil holes Q2 as well.

Furthermore, since the third supply port R3 and the fourth supply port R4 are relatively close to the entrance section 54, then it is possible to supply lubricating oil adequately to the outer circumferential section of the input shaft 4, respectively from the third supply port R3 to the third subsidiary oil hole Q3 and from the fourth supply port R4 to the fourth subsidiary oil hole Q4.

As described above, according to the present embodiment, it is possible to guide lubricating oil in a uniform and satisfactory fashion to the outer circumferential section of the input shaft 4, via the subsidiary oil passages S1 to S4 constituted by the supply ports R1 to R4 of the hollow member 51 and the subsidiary oil holes Q1 to Q4 of the input shaft 4.

The lubricating oil which is guided to the outer circumferential section of the input shaft 4 from the plurality of subsidiary oil passages S1 to S4 having different positions in the axial direction is supplied to the parts requiring lubrication in the transmission gears 13 to 16 and the synchronization devices 20, 40, by the centrifugal force produced by rotation of the input shaft 4, and a satisfactory oil film is formed on each of the parts requiring lubrication, regardless of the position in the axial direction. Therefore, even in a driving state where insufficient lubrication occurs as, for example, the manual transmission 1 is in neutral, it is possible, for example, to effectively reduce the friction occurring in the free fitting sections of the transmission gears 13 to 16, and to effectively suppress abnormal noise in the indexing section 50 of the synchronization devices 20, 40.

A case was described above, in which only the first supply ports R1 are disposed in the guide groove 61, but in the present invention, it is also possible to dispose at least one of the supply ports R2 to R4 other than the first supply ports R1 in the guide groove 61, also.

Second Embodiment

Figure 6A:
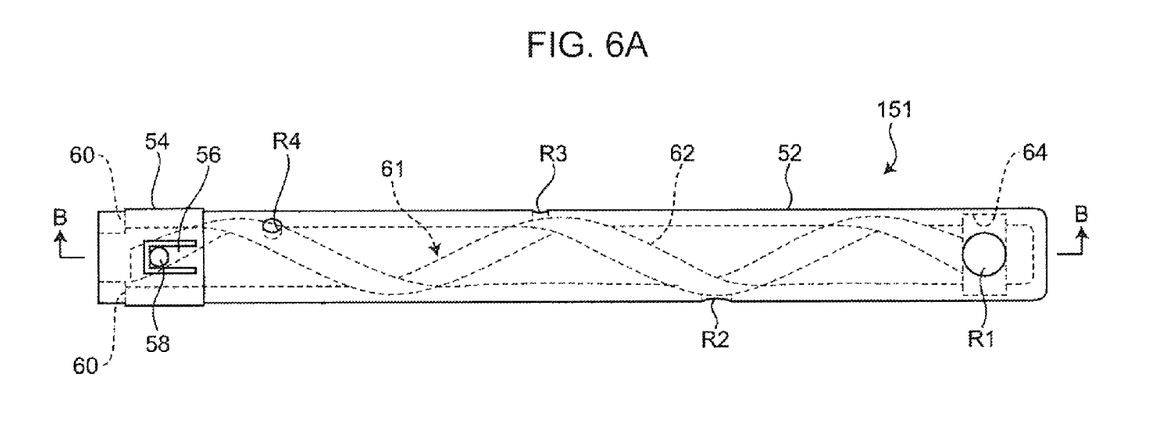
FIG. 6A is a side face diagram of a hollow member relating to a further embodiment and FIG. 6B is a cross-sectional diagram along B-B in FIG. 6A.
Figure 6B:
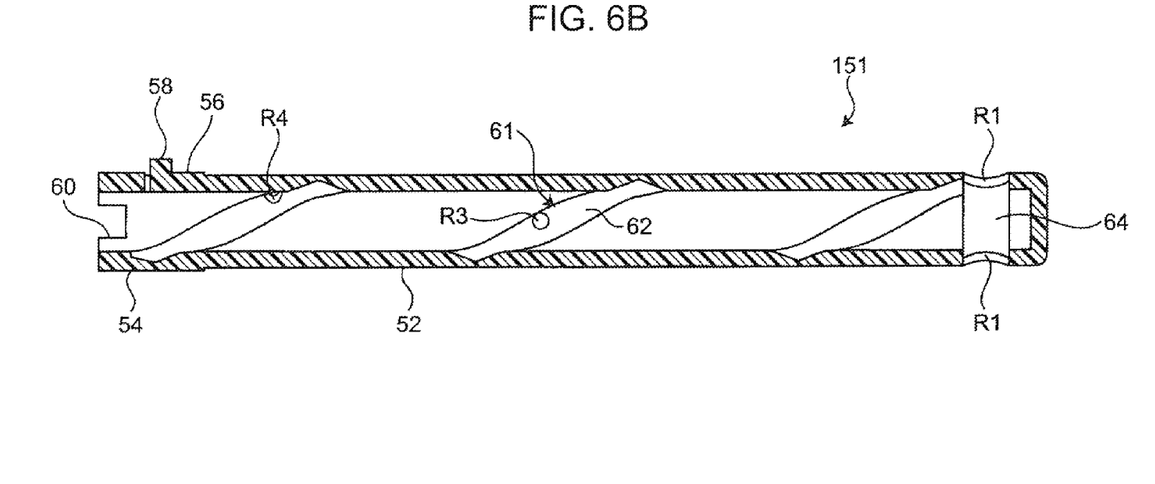
Figure 7:
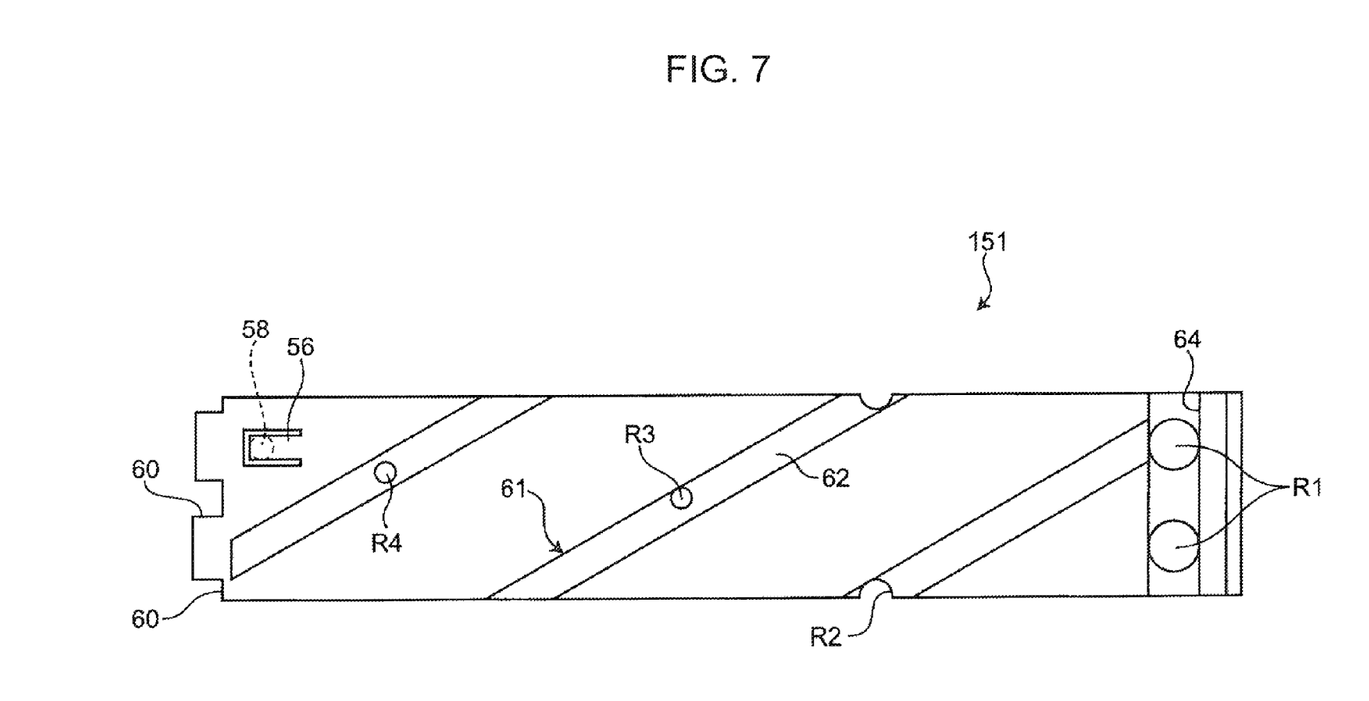
FIG. 7 is an expanded diagram of the inner circumferential surface of the hollow member shown in FIG. 6.

The hollow member 151 relating to a further embodiment is described below with reference to FIG. 6 and FIG. 7. In FIG. 6 and FIG. 7, constituent elements which are the same as the constituent element shown in FIG. 1 to FIG. 5 are labelled with the same reference numerals.

In the hollow member 151 shown in FIG. 6 and FIG. 7, the second supply port R2, the third supply port R3 and the fourth supply port R4 are disposed in a spiral groove section 62 of the guide groove 61, on the inner circumferential surface of the hollow member 151. In other words, in this second embodiment, all of the supply ports R1 to R4 are disposed in the guide groove 61. Furthermore, in this hollow member 151, only one second supply port R2 is provided, unlike the hollow member 51 of the first embodiment.

The size of the surface areas of the supply ports R1 to R4 is the same as the hollow member 51 of the first embodiment. Furthermore, the rest of the composition of the hollow member 151 is the same as the composition of the hollow member 51 of the first embodiment, and description thereof is omitted here.

If this hollow member 151 is used, then since each of the supply ports R1 to R4 is disposed in the guide groove 61 it is possible to supply lubricating oil satisfactorily, using the guide groove 61, to all of the supply ports R1 to R4 and hence to all of the subsidiary oil holes Q1 to Q4 of the input shaft 4.

Moreover, by making the supply ports R1 to R4 have a larger surface area in proportion to the distance away from the entrance section 54, it is possible to suppress variation in the amount of lubricating oil supplied to the subsidiary oil holes Q1 to Q4. Therefore, if the hollow member 151 shown in FIG. 6 and FIG. 7 is used, it is also possible to achieve satisfactory lubrication in the parts requiring lubrication corresponding to the subsidiary oil passages S1 to S4 constituted by the supply ports R1 to R4 of the hollow member 151 and the subsidiary oil holes Q1 to Q4 of the input shaft 4, irrespective of the position in the axial direction.

The present invention has been described here with reference to the aforementioned embodiments, but the present invention is not limited to these embodiments.

For example, the number and diameter of the subsidiary oil holes Q1 to Q4 in the input shaft 4 and the supply ports R1 to R4 in the hollow member 51 can be varied as appropriate, with the object of optimizing the supply of lubricating oil.

Moreover, the embodiments above were described with reference to a case where a hollow member 51 fitted inside the input shaft 4 is used as one portion of the internal oil passage of the input shaft 4, but in the present invention, it is also possible to compose the oil passage inside the input shaft by oil holes formed in the input shaft, only.

Moreover, the embodiments above were described with reference to a case where lubricating oil is supplied to parts requiring lubrication on an input shaft 4, but the present invention can also be applied to a case where lubricating oil is supplied to parts requiring lubrication on a rotary shaft other than an input shaft in a transmission.

Moreover, the embodiments above were described with reference to a lubrication structure of a manual transmission 1, but the present invention is not limited to a manual transmission and can also be applied similarly to an automatic transmission or continuously variable transmission, provided that the transmission is one in which a plurality of parts requiring lubrication are present on a rotary shaft at different positions in the axial direction.

The present invention as described above can be summarized as follows.

More specifically, the present invention is a lubrication structure for a transmission, having: a rotary shaft which is driven to rotate in a predetermined direction, and, a plurality of parts requiring lubrication provided on the rotary shaft, at mutually different positions in an axial direction, wherein provided inside the rotary shaft are: a main oil passage that has an entrance at one end of the rotary shaft in the axial direction, and that extends in the axial direction from the entrance: and a plurality of subsidiary oil passages that extend in radial directions at positions in the axial direction corresponding to the parts requiring lubrication and that are communicated with an outer circumferential section of the rotary shaft and with the main oil passage; a guide groove including a groove section extending from the vicinity of the entrance of the main oil passage to a side opposite the entrance is formed on an inner circumferential surface of the main oil passage; the groove section is provided in an inclined fashion with respect to the axial direction such that lubricating oil inside the groove section is sent toward the side opposite the entrance, by rotation of the rotary shaft in the predetermined direction; and of the plurality of subsidiary oil passages, an entrance of the subsidiary oil passage most distant from the entrance of the main oil passage is disposed in the guide groove.

According to the present invention, since a groove section extending from the vicinity of the entrance of the main oil passage to the side opposite the entrance is provided in an inclined fashion with respect to the axial direction, in the inner circumferential surface of the main oil passage which is provided so as to extend in the axial direction inside the rotary shaft of the transmission, then it is possible to send the lubricating oil that has been introduced into the main oil passage, towards the side opposite the entrance, by utilizing the rotation of the rotary shaft and the inclination of the groove section. Of the plurality of subsidiary oil passages provided inside the rotary shaft so as to extend in radial directions at positions, in the axial direction, corresponding to the parts requiring lubrication, the entrance of the subsidiary oil passage most distant from the entrance of the main oil passage is disposed in the guide groove which includes the groove section. Therefore, lubricating oil can be supplied in a favorable amount to the subsidiary oil passage which is most distant from the entrance of the main oil passage, and to which it has therefore been difficult to supply lubricating oil with a conventional structure, and subsequently to the parts requiring lubrication that correspond to subsidiary oil passages, by using the guide groove, whereby insufficient lubrication in the parts requiring lubrication can be suppressed effectively. In other words, it is possible to prevent insufficient lubrication in the parts requiring lubrication corresponding to the subsidiary oil passages, effectively, irrespective of the position of the subsidiary oil passage in the axial direction.

Furthermore, in forming the groove section in the inner circumferential surface of the main oil passage, since there is no need to narrow the entrance of the main oil passage or enlarge the diameter of the rotary shaft, then the amount of lubricating oil introduced into the main oil passage can be maintained satisfactorily, and furthermore the transmission can be prevented from becoming larger in size.

In the present invention, desirably, at least one of the subsidiary oil passages has an entrance in a portion avoiding the guide groove, in the inner circumferential surface of the main oil passage.

According to this composition, since at least one of the subsidiary oil passage disposed in the vicinity of the entrance of the main oil passage, compared to the most distant subsidiary oil passage, has an entrance in a portion avoiding the guide groove in the inner circumferential surface of the main oil passage, then the lubricating oil guided by the guide groove is prevented from flowing out to another subsidiary oil passage before reaching the entrance of the most distant subsidiary oil passage, and lubricating oil can be supplied to the most distant subsidiary oil passage in a concentrated fashion.

In the present invention, desirably, the surface areas of the entrances of the remaining subsidiary oil passages are smaller than that of the subsidiary oil passage most distant from the entrance of the main oil passage.

According to this composition, since the surface areas of the entrances of the remaining subsidiary oil passages are small compared that of to the most distant subsidiary oil passage, then it is possible to supply a larger amount of lubricating oil to the most distant subsidiary oil passage compared to a case where the surface areas of the entrances of all of the subsidiary oil passages are equal.

In the present invention, desirably, the groove section is formed in a spiral shape along the inner circumferential surface of the main oil passage.

According to this composition, by the groove section which is formed in a spiral shape along the inner circumferential surface of the main oil passage, it is possible to send lubricating oil effectively towards the side opposite the entrance of the main oil passage, by utilizing the inclination of the groove section and the rotation of the rotary shaft.

In the present invention, desirably, a first subsidiary oil passage, a second subsidiary oil passage and a third subsidiary oil passage (corresponding to the third subsidiary oil passage S3 and the fourth subsidiary oil passage S4 of the embodiment) are provided, in sequence from the most distant from the entrance of the main oil passage, as the plurality of subsidiary oil passages; and on the inner circumferential surface of the main oil passage, the entrance of the first subsidiary oil passage is provided in the guide groove, the entrance of the second subsidiary oil passage has a smaller surface area than the entrance of the first subsidiary oil passage and is provided in a portion avoiding the guide groove and the entrance of the third subsidiary oil passage has a smaller surface area than the entrance of the second subsidiary oil passage and is provided in a portion avoiding the guide groove.

According to this composition, of the first subsidiary oil passage, the second subsidiary oil passage and the third subsidiary oil passage, the entrance of the first subsidiary oil passage that is most distant from the entrance of the main oil passage is provided in the guide groove, the entrance of the second subsidiary oil passage which is the next most distant from the entrance of the main oil passage has a smaller surface area than the entrance of the first subsidiary oil passage and is provided in a portion avoiding the guide groove, and the entrance of the third subsidiary oil passage which is closest to the main oil passage has a smaller surface area than, the entrance of the second subsidiary oil passage and is provided in a portion avoiding the guide groove. Consequently, variation in the amount of lubricating oil supplied to the respective subsidiary oil passages can be suppressed and lubricating oil can be supplied, satisfactorily to the parts requiring lubrication.

In the present invention, desirably, an oil hole extending in the axial direction and a positioning hole extending in the radial direction are provided in the rotary shaft; the main oil passage is composed by a cylindrical hollow member having a positioning pin projecting on an outer circumferential surface; the hollow member is fitted into the oil hole in a state where the positioning pin is engaged in the positioning hole; and a bearing that supports the rotary shaft is disposed so as to close off the positioning hole from the outer side in the radial direction.

According to this composition, if the cylindrical hollow member constituting a main oil passage is fitted into the oil hole extending in the axial direction which is provided in the rotary shaft, then since the positioning hole of the rotary shaft which engages with the positioning pin of the hollow member is closed off from the outer side in the radial direction by the bearing which supports the rotary shaft, it is possible to suppress leakage of lubricating oil from the positioning hole by utilizing the bearing, without having to provide a special member to close off the positioning hole.

In the present invention, desirably, a first subsidiary oil passage, a second subsidiary oil passage and a third subsidiary oil passage (corresponding to the third subsidiary oil passage S3 and the fourth subsidiary oil passage S4 of the embodiment) are provided, in sequence from the most distant from the entrance of the main oil passage, as the plurality of subsidiary oil passages; the entrances of the first subsidiary oil passage, the second subsidiary oil passage and the third subsidiary oil passage are disposed in the guide groove; and the surface area of the entrance of the subsidiary oil passage is larger in order of the first subsidiary oil passage, the second subsidiary oil passage, and the third subsidiary oil passage.

According to this composition, in a case where the first subsidiary oil passage, the second subsidiary oil passage and the third subsidiary oil passage are provided in sequence from the most distant from the entrance of the main oil passage, the entrances of each of the subsidiary oil passages are disposed in the guide groove, and the surface area of the entrance of the subsidiary oil passage is larger in order of the first subsidiary oil passage, the second subsidiary oil passage, and the third subsidiary oil passage. Consequently, lubricating oil is supplied satisfactorily by using the guide groove, to each of the subsidiary oil passages, and furthermore, since the subsidiary oil passages have a larger entrance in proportion to the distance further away from the entrance of the main oil passage, then variation in the amount of lubricating oil supplied to the respective subsidiary oil passages can be suppressed.

This application is based on Japanese Patent Application No. 2012-125731 filed on 1 Jun. 2012, the contents of which are incorporated into the present application.

In order to represent the present invention, the invention has been described appropriately and sufficiently above by embodiments with reference to drawings, but it is to be understood that a person skilled in the art could easily change and/or modify the embodiments described above. Consequently, provided that changes or modifications made by a person skilled in the art do not depart from the scope of the claims indicated herein, such changes or modifications are interpreted as being encompassed within the scope of the claims.

INDUSTRIAL APPLICABILITY

As described above, according to the present invention, it is possible effectively to prevent insufficient lubrication in parts requiring lubrication corresponding to subsidiary oil passages, irrespective of the positions of the subsidiary oil passages in the axial direction, while avoiding increase in the size of a transmission, in a lubrication structure for a transmission in which a main oil passage extending in the axial direction from one end of a rotary shaft for transmitting, drive power, and a plurality of subsidiary oil passages extending in radial directions and communicating with the main oil passage and the outer circumferential section of the rotary shaft, are formed inside the rotary shaft, and therefore the invention can be used appropriately in the field of manufacturing transmissions of this type.

The invention claimed is:

1. A lubrication structure for a transmission, having: a rotary shaft which is driven to rotate in a predetermined direction, and a plurality of parts requiring lubrication provided on the rotary shaft, at mutually different positions in an axial direction, wherein
provided inside the rotary shaft are:
a main oil passage that has an entrance at one end of the rotary shaft in the axial direction, and that extends in the axial direction from the entrance; and
a plurality of subsidiary oil passages that extend in radial directions at positions in the axial direction corresponding to the parts requiring lubrication and that are communicated with an outer circumferential section of the rotary shaft and with the main oil passage;
a guide groove including a groove section extending from the vicinity of the entrance of the main oil passage to a side opposite the entrance is formed on an inner circumferential surface of the main oil passage;
the groove section is provided in an inclined fashion with respect to the axial direction such that lubricating oil inside the groove section is sent toward the side opposite the entrance, by rotation of the rotary shaft in the predetermined direction;
of the plurality of subsidiary oil passages, an entrance of the subsidiary oil passage most distant from the entrance of the main oil passage is disposed in the guide groove;
an oil hole extending in the axial direction and a positioning hole extending in the radial direction are provided in the rotary shaft;

the main oil passage is composed by a cylindrical hollow member having a positioning pin projecting on an outer circumferential surface;

the hollow member is fitted into the oil hole in a state where the positioning pin is engaged in the positioning hole; and a bearing that supports the rotary shaft is disposed so as to close off the positioning hole from the outer side in the radial direction.

2. The lubrication structure for a transmission according to claim 1, wherein at least one of the subsidiary oil passages has an entrance in a portion avoiding the guide groove, in the inner circumferential surface of the main oil passage.

3. The lubrication structure for a transmission according to claim 2, wherein the surface areas of the entrances of the remaining subsidiary oil passages are smaller than that of the subsidiary oil passage most distant from the entrance of the main oil passage.

4. The lubrication structure for a transmission according to claim 3, wherein the groove section is formed in a spiral shape along the inner circumferential surface of the main oil passage.

5. The lubrication structure for a transmission according to claim 4, wherein a first subsidiary oil passage, a second subsidiary oil passage and a third subsidiary oil passage are provided, in sequence from the most distant from the entrance of the main oil passage, as the plurality of subsidiary oil passages; and on the inner circumferential surface of the main oil passage, the entrance of the first subsidiary oil passage is provided in the guide groove, the entrance of the second subsidiary oil passage has a smaller surface area than the entrance of the first subsidiary oil passage and is provided in a portion avoiding the guide groove, and the entrance of the third subsidiary oil passage has a smaller surface area than the entrance of the second subsidiary oil passage and is provided in a portion avoiding the guide groove.

6. The lubrication structure for a transmission according to claim 3, wherein a first subsidiary oil passage, a second subsidiary oil passage and a third subsidiary oil passage are provided, in sequence from the most distant from the entrance of the main oil passage, as the plurality of subsidiary oil passages; and on the inner circumferential surface of the main oil passage, the entrance of the first subsidiary oil passage is provided on the guide groove, the entrance of the second subsidiary oil passage has a smaller surface area than the entrance of the first subsidiary oil passage and is provided in a portion avoiding the guide groove, and the entrance of the third subsidiary oil passage has a smaller surface area than the entrance of the second subsidiary oil passage and is provided in a portion avoiding the guide groove.

7. The lubrication structure for a transmission according to claim 2, wherein the groove section is formed in a spiral shape along the inner circumferential surface of the main oil passage.

8. The lubrication structure for a transmission according to claim 7, wherein a first subsidiary oil passage, a second subsidiary oil passage and a third subsidiary oil passage are provided, in sequence from the most distant from the entrance of the main oil passage, as the plurality of subsidiary oil passages; and on the inner circumferential surface of the main oil passage, the entrance of the first subsidiary oil passage is provided on the guide groove, the entrance of the second subsidiary oil passage has a smaller surface area than the entrance of the first subsidiary oil passage and is provided in a portion avoiding the guide groove, and the entrance of the third subsidiary oil passage has a smaller surface area than the entrance of the second subsidiary oil passage and is provided in a portion avoiding the guide groove.

9. The lubrication structure for a transmission according to claim 2, wherein a first subsidiary oil passage, a second subsidiary oil passage and a third subsidiary oil passage are provided, in sequence from the most distant from the entrance of the main oil passage, as the plurality of subsidiary oil passages; and on the inner circumferential surface of the main oil passage, the entrance of the first subsidiary oil passage is provided on the guide groove, the entrance of the second subsidiary oil passage has a smaller surface area than the entrance of the first subsidiary oil passage and is provided in a portion avoiding the guide groove, and the entrance of the third subsidiary oil passage has a smaller surface area than the entrance of the second subsidiary oil passage and is provided in a portion avoiding the guide groove.

10. The lubrication structure for a transmission according to claim 1, wherein the surface areas of the entrances of the remaining subsidiary oil passages are smaller than that of the subsidiary oil passage most distant from the entrance of the main oil passage.

11. The lubrication structure for a transmission according to claim 10, wherein the groove section is formed in a spiral shape along the inner circumferential surface of the main oil passage.

12. The lubrication structure for a transmission according to claim 11, wherein a first subsidiary oil passage, a second subsidiary oil passage and a third subsidiary oil passage are provided, in sequence from the most distant from the entrance of the main oil passage, as the plurality of subsidiary oil passages; and on the inner circumferential surface of the main oil passage, the entrance of the first subsidiary oil passage is provided on the guide groove, the entrance of the second subsidiary oil passage has a smaller surface area than the entrance of the first subsidiary oil passage and is provided in a portion avoiding the guide groove, and the entrance of the third subsidiary oil passage has a smaller surface area than the entrance of the second subsidiary oil passage and is provided in a portion avoiding the guide groove.

13. The lubrication structure for a transmission according to claim 10, wherein a first subsidiary oil passage, a second subsidiary oil passage and a third subsidiary oil passage are provided, in sequence from the most distant from the entrance of the main oil passage, as the plurality of subsidiary oil passages; and on the inner circumferential surface of the main oil passage, the entrance of the first subsidiary oil passage is provided on the guide groove, the entrance of the second subsidiary oil passage has a smaller surface area than the entrance of the first subsidiary oil passage and is provided in a portion avoiding the guide groove, and the entrance of the third subsidiary oil passage has a smaller surface area than the entrance of the second subsidiary oil passage and is provided in a portion avoiding the guide groove.

14. The lubrication structure for a transmission according to claim 1, wherein the groove section is formed in a spiral shape along the inner circumferential surface of the main oil passage.

15. The lubrication structure for a transmission according to claim 14, wherein
 a first subsidiary oil passage, a second subsidiary oil passage and a third subsidiary oil passage are provided, in sequence from the most distant from the entrance of the main oil passage, as the plurality of subsidiary oil passages; and
 on the inner circumferential surface of the main oil passage, the entrance of the first subsidiary oil passage is provided on the guide groove, the entrance of the second subsidiary oil passage has a smaller surface area than the entrance of the first subsidiary oil passage and is provided in a portion avoiding the guide groove, and the entrance of the third subsidiary oil passage has a smaller surface area than the entrance of the second subsidiary oil passage and is provided in a portion avoiding the guide groove.

16. The lubrication structure for a transmission according to claim 14, wherein
 a first subsidiary oil passage, a second subsidiary oil passage and a third subsidiary oil passage are provided, in sequence from the most distant from the entrance of the main oil passage, as the plurality of subsidiary oil passages;
 the entrances of the first subsidiary oil passage, the second subsidiary oil passage and the third subsidiary oil passage are disposed in the guide groove; and
 the surface area of the entrances of the subsidiary oil passages is larger in order of the first subsidiary oil passage, the second subsidiary oil passage, and the third subsidiary oil passage.

17. The lubrication structure for a transmission according to claim 1, wherein
 a first subsidiary oil passage, a second subsidiary oil passage and a third subsidiary oil passage are provided, in sequence from the most distant from the entrance of the main oil passage, as the plurality of subsidiary oil passages; and
 on the inner circumferential surface of the main oil passage, the entrance of the first subsidiary oil passage is provided on the guide groove, the entrance of the second subsidiary oil passage has a smaller surface area than the entrance of the first subsidiary oil passage and is provided in a portion avoiding the guide groove, and the entrance of the third subsidiary oil passage has a smaller surface area than the entrance of the second subsidiary oil passage and is provided in a portion avoiding the guide groove.

18. The lubrication structure for a transmission according to claim 1, wherein
 a first subsidiary oil passage, a second subsidiary oil passage and a third subsidiary oil passage are provided, in sequence from the most distant from the entrance of the main oil passage, as the plurality of subsidiary oil passages;
 the entrances of the first subsidiary oil passage, the second subsidiary oil passage and the third subsidiary oil passage are disposed in the guide groove; and
 the surface area of the entrances of the subsidiary oil passages is larger in order of the first subsidiary oil passage, the second subsidiary oil passage, and the third subsidiary oil passage.

* * * * *